United States Patent [19]

Carpenter

[11] Patent Number: 5,414,941
[45] Date of Patent: May 16, 1995

[54] DIESEL ENGINE SERVICE TOOL KIT

[76] Inventor: Donald L. Carpenter, 5294 Waterloo Rd., Burlington, Ky. 41005

[21] Appl. No.: 171,015

[22] Filed: Dec. 21, 1993

Related U.S. Application Data

[63] Continuation-in-part of Ser. No. 35,294, Mar. 22, 1993, abandoned.

[51] Int. Cl.⁶ .................................................. G01B 3/22
[52] U.S. Cl. ........................................ 33/601; 33/600; 33/792
[58] Field of Search ................ 33/600, 601, 603, 604, 33/605, 607, 611, 792, 794, 795, 796, 802, 832, 783

[56] References Cited

U.S. PATENT DOCUMENTS

| | | | |
|---|---|---|---|
| 1,496,270 | 6/1924 | Jones | 33/604 |
| 1,758,271 | 5/1930 | Zittmann | 33/601 |
| 2,032,584 | 3/1936 | Lengel et al. | 33/792 |
| 2,471,746 | 5/1949 | Hilbert | 33/601 |
| 2,662,298 | 12/1953 | Cole | 33/607 |
| 2,796,674 | 6/1957 | Ross | 33/607 |
| 2,825,972 | 3/1958 | Burchell | 33/792 |
| 3,716,922 | 2/1973 | Shaver | 33/794 |
| 4,170,072 | 10/1979 | Downs | 33/607 |
| 4,503,619 | 3/1985 | Nelsen et al. | 33/836 |
| 4,864,731 | 9/1989 | Kile et al. | 33/832 |
| 5,077,909 | 1/1992 | Cranor | 33/607 |

OTHER PUBLICATIONS

*Caterpillar Service Manual 3116 Diesel Truck Engine,* 1989 Caterpillar Inc., Form No. SEBR0550, pp. 3-6 to 3-18.

*Primary Examiner*—William A. Cuchlinski, Jr.
*Assistant Examiner*—G. Bradley Bennett
*Attorney, Agent, or Firm*—Wood, Herron & Evans

[57] ABSTRACT

A service tool kit to perform synchronizing, fuel setting and fuel timing on a diesel truck engine. These adjustments are done without removing the rocker arm assemblies through the use of the access positioning tool included in the kit. All three calibrations can be made by inserting a holding fixture and other associated tools into the injector area without engine bolt removal or separate dial indicator setup.

6 Claims, 2 Drawing Sheets

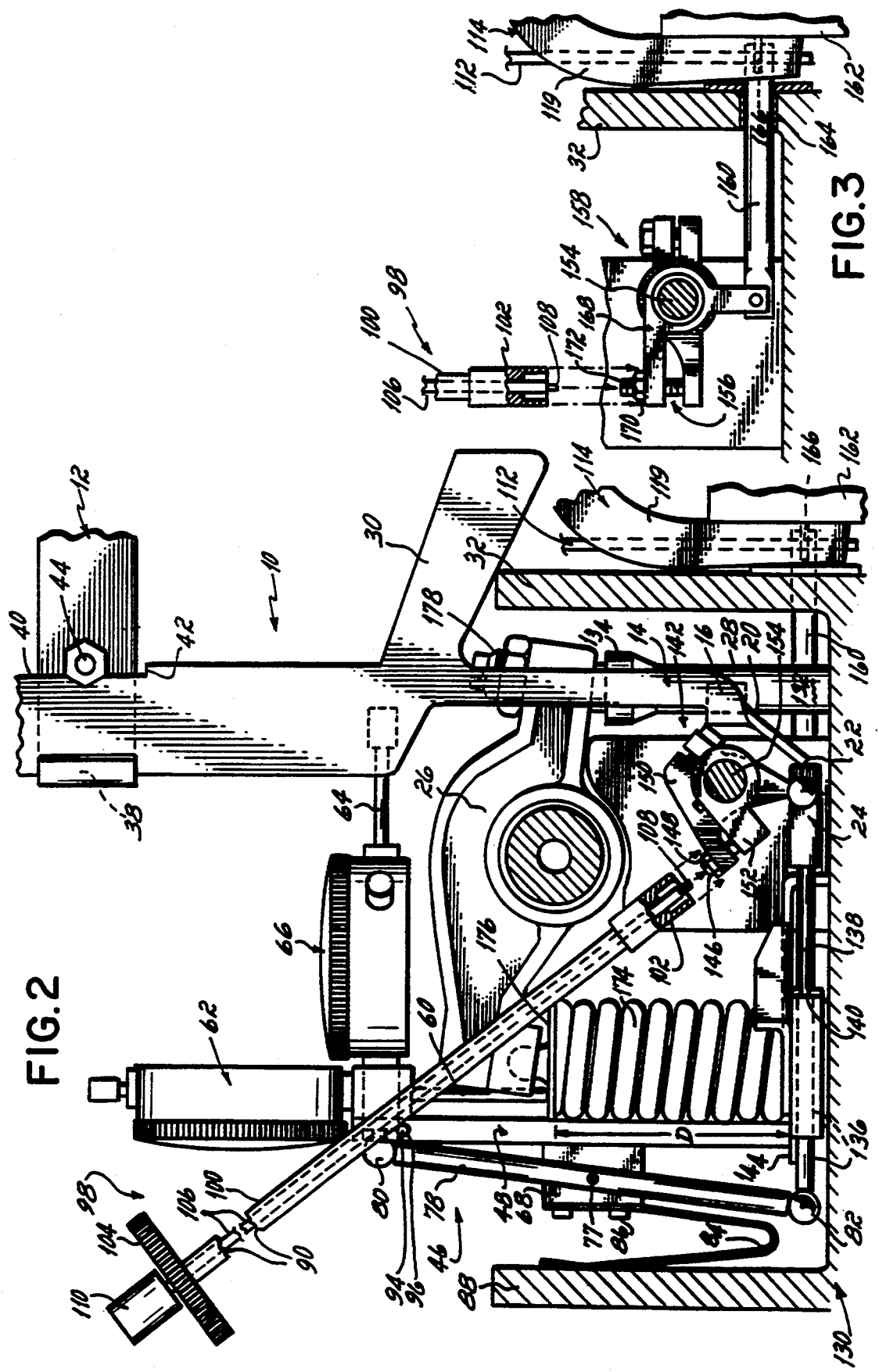

DIESEL ENGINE SERVICE TOOL KIT

This is a continuation-in-part of application Ser. No. 08/035,294 filed Mar. 22, 1993, now abandoned.

BACKGROUND OF THE INVENTION

1. Field of the Invention

The present invention relates to an engine service tool kit. More specifically to a unique service tool kit to perform synchronizing, fuel setting and fuel timing adjustments on a 3116 diesel truck engine.

2. Background of the Invention

A tune-up of the 3116 diesel truck engine includes three measurements that must be made with a dial indicator on the injectors. These measurements are synchronization, fuel timing, and fuel setting.

Injector synchronization is the setting of each injector rack to a reference position so each injector delivers the same amount of fuel to the respective cylinder. Synchronization is accomplished by setting each injector rack to a predetermined position while the control linkage connecting all of the injectors is in a reference fixed position. This reference position is called the synchronizing or fuel shutoff position.

The control linkage is in the synchronizing position when the injector of the No. 1 injector is at fuel shut,off with a rack stop bar in contact with an injector base for the No. 1 injector. The rack stop bar projects from a rack head which is coupled to an injector rack control linkage. The injector rack control linkage for each cylinder is mounted on a common spring biased injector rack shaft. Since the No. 1 injector is the reference point for the other injectors, no synchronizing adjustment is made on the No. 1 injector.

However, to maintain the No. 1 injector in the fuel shutoff synchronizing position, the spring bias of the, injector rack shaft and the rack stop bar must be overcome. Previously, the technician or mechanic physically overcame the spring bias by manually holding the rack stop bar against the injector base. The technician had to keep constant contact of the rack head to keep the rack stop bar in contact with the injector base of the No. 1 injector with one of his hands while the delicate adjustments of synchronizing the remaining injectors are made with the other hand.

Furthermore, an injector must be synchronized each time it has been removed and reinstalled or replaced. If the No. 1 injector is removed or replaced, all the injectors must be synchronized. The synchronizing procedure required the removal of the rocker arm assemblies for the No. 1 injector and for each of the injectors to be synchronized. Removal of the rocker arm assemblies provides greater access for the technician to the control linkage and injector rack head, but is a very time consuming procedure. Furthermore, checking the valve clearance and fuel timing is recommended after each removal and reinstallation of the rocker arm assemblies, which further burdens the technician.

When the rocker arm assemblies are removed, the rack bar cannot be moved for adjustment until bolts from the top of the cylinder head are removed and an injector spring compressor is installed using these bolt holes. Once the rocker arm assemblies are removed, these spring compressors need to be installed on the No. 1 injector and any or all of the other injectors that are to be synchronized.

Fuel setting on the 3116 diesel truck engine is accomplished by the adjustment of a fuel setting screw to provide a specified injector rack position for the No. 1 injector rack bar. The fuel setting adjustment limits the power output of the engine by setting the maximum travel of all the injector racks. Before the fuel setting is checked, the injectors must all be correctly synchronized. The fuel setting adjustment requires that a dial indicator be mounted horizontally in an indicator group fixture which includes a pivot bar. An upper end of the pivot bar contacts a terminal end of a shaft on the dial indicator while a lower end of the pivot bar contacts an end of a rack bar which projects from the rack head and through the injector base. The dial indicator measures the rack bar position through the angular position of the pivot bar. The synchronizing and fuel setting adjustments each establish a specified measured distance between the rack bar and the injector base. Fuel setting also requires removal of the No. 1 injector rocker arm assembly to establish a reference or zero reading on the dial indicator.

Fuel timing contemplates an adjustment on each injector to measure the height of the injector spring. The measurement is the distance between the top of a spring retainer or tappet to the top of a shoulder on the injector base at a specified time. In the past, the dial indicator (used for synchronizing and fuel setting) was required to be removed from the indicator group fixture and also used for the fuel timing measurement. An "off engine", i.e., separate from the engine, timing fixture is used to set the dial indicator to a pre-determined reference measurement which is later compared to the height of each injector spring to measure the fuel timing. A bracket housing the dial indicator is mounted onto the timing fixture with the length of the indicator shaft being calibrated on a standard height timing block. The dial indicator is then adjusted to zero. The bracket housing the indicator is then transferred to each injector for a timing measurement on the height of that particular injector spring. A fuel timing adjustment screw at the opposite end of the rocker arm adjusts the height of the spring as required.

SUMMARY OF THE INVENTION

One of the principal objectives of the present invention is to eliminate the need to remove the rocker arm assemblies for fuel setting and synchronizing calibrations of a diesel engine.

Another objective of this invention is to eliminate the need for off-engine dial indicator set-ups for fuel setting and synchronization.

Another objective is to eliminate the need to remove bolts from the cylinder head area to attach dial indicator fixtures for calibration measurements.

Another objective of this invention is to provide a holding fixture, complete with dial indicators, which can be removably inserted by hand onto the engine in the injector area to facilitate all three calibrations (synchronization, fuel setting, and fuel timing).

A still further objective has been to provide an improved kit for synchronizing, fuel timing and fuel setting a diesel engine.

A still further objective has been to provide improved tools for tuning a diesel engine more efficiently and quickly than in the past.

These objectives are attained in a preferred embodiment by a diesel engine service tool kit to aid a mechanic or technician in the synchronization, fuel timing, and fuel setting adjustments on a diesel engine. The service tool kit of this invention includes a lever which when coupled with a weight assist arm arid positioned on the No. 1 injector of the engine maintains the injector in a fuel shutoff or synchronization position. The lever is easily positioned with respect to a push rod of the No. 1 injector such that a lower edge of the lever contacts a spring biased rack head. A depth limit arm projects from the central portion of the lever and slidably contacts a rocker arm manifold housing to maintain the lower edge of the lever in the appropriate vertical position to contact the rack head. When coupled to an upper end of the lever, a weight assist arm overcomes the spring bias of the rack head to maintain the No. 1 injector in the fuel shutoff configuration without continued assistance by the technician. As a result, the engine is maintained in the fuel shutoff position without the time consuming task of removing the rocker assemblies which was previously required to permit access by the technician to manually hold the rack head in the fuel shutoff position.

The diesel engine service tool kit also includes a fuel setting and synchronization adjustment tool which enables the technician to adjust a fuel setting screw, set screw and locknut with a single hand, The synchronization and fuel setting adjustment tool of this invention has a tubular elongated housing with a socket attached to a lower end thereof to engage a locknut on the injector rack control linkage of the engine. At the upper end of the elongated tubular housing is a handwheel which enables the technician to loosen or tighten the locknut regardless of the angular orientation of the tool in the technician's hand, Prior art tools only had a stub shaft which had to be properly oriented in the technician's hand in order to be effectively used. In the invention, an inner rod is slidably and rotationally mounted within the tubular housing. An Allen wrench extends from the lower end thereof. Once the socket is seated on the locknut and the locknut is released, the Allen wrench is axially projected through the tubular housing and socket to engage a set screw seated within the locknut. At the upper end of the rod is an adjustment knob positioned atop the handwheel which is rotated to adjust the set screw during synchronization and fuel setting operations.

The tool kit of this invention also includes a dual indicator dial holding fixture which enables the technician to perform synchronization, fuel setting, and fuel timing operations on the engine without the removal of the rocker arm assemblies as required in prior art operations. The holding fixture includes a generally inverted L-shaped base with both a vertical and horizontal bore hole through a shorter leg of the L-shaped base. A shaft extends from each dial indicator and is mounted through one of the bore holes on the base; to thereby provide both a horizontal dial indicator for synchronization and fuel setting and a vertical dial indicator for fuel timing on the same holding fixture. When mounted on the injector to be adjusted in a calibration position, the L-shaped base is inverted such that a free end of the shaft on the vertical indicator contacts a tappet at the top end of the injector spring. The vertical dial indicator is calibrated according to engine specifications to measure the height of the injector spring with respect to an injector base shoulder when the holding fixture is in the calibration position. As a result, a fuel timing adjustment screw located on the rocker arm assembly can be adjusted with a standard screwdriver as required to adjust the injector spring height for the fuel timing operation.

A pivot rod is pinned to a mounting block secured to the longer leg of the L-shaped base. The pivot rod has a contact ball at a lower and an upper end thereof. The upper contact ball contacts the free end of the shaft of the horizontal dial indicator and the lower contact ball contacts the terminal end of a rack bar on the injector which projects through the injector base and is connected to the rack head on the cylinder. With the holding fixture thusly mounted on the injector in the calibration position, the horizontal dial indicator measures the relative position of the rack bar with respect to the injector base so that the technician can perform synchronization and fuel setting operations on the respective cylinders of the engine. A leaf spring is secured to the mounting block so that the holding fixture can be securely and releasably inserted into the calibration position by compacting the leaf spring against a rocker arm manifold housing of the engine.

The diesel engine service tool kit of this invention also includes an insertion tool, a holding tool forceps, and an injector timing calibration block each of which are also required to perform synchronization, fuel timing, and fuel setting operations on the engine.

The advantages of this invention over the prior art include:
A. Synchronizing and fuel setting can be calibrated without removing the rocker arm assemblies.
B. There is no need for installing injector spring compressors.
C. All three measurements can be made with a single dial indicator holding fixture.
D. The holding fixture with dual dial indicators can easily be inserted into the calibration position. There is no need to remove bolts from cylinder head to secure tool as in prior art.
E. There is no need to exchange one dial indicator from one set-up position to another.
F. The new service tool kit offers; a reduction of 50% or more (2½ hours or more) in the time required for synchronizing, fuel setting, and fuel timing.
G. There is no need for off-engine dial indicator setup for synchronization and fuel setting calibration procedures.

BRIEF DESCRIPTION OF THE DRAWINGS

The objectives and features of this invention will become readily apparent from the following detailed description taken in conjunction with the accompanying drawings in which:

FIG. 2 is a partial cross-sectional plan view of the injector and injector rack on a diesel engine with the holdling fixture, lever and weight assist arm, adjusting tool, insertion tool, and holding forceps tool of this invention; and FIG. 3 is a partial cross-sectional view of the fuel setting screw and holding clamp assembly on the No. 1 injector of the diesel engine.

DETAILED DESCRIPTION

Figure 1:
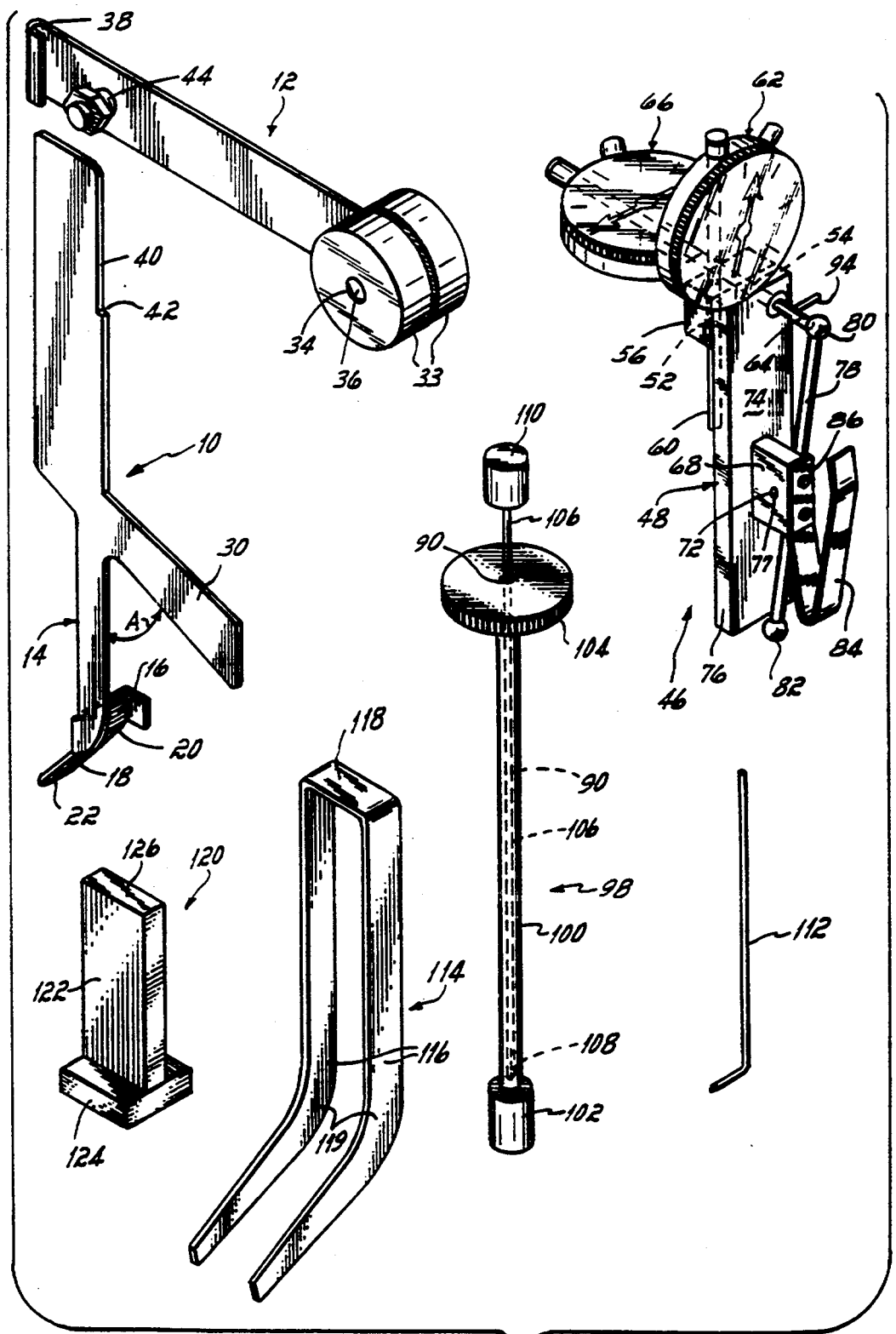
FIG. 1 is a perspective view of the components of the diesel engine service tool kit of this invention.

As shown in FIG. 1, the diesel engine service tool kit 8 includes a lever 10, a weight assist arm 12, a dual dial indicator holding fixture 46, adjusting tool 98, a calibration block 120, an insertion tool 112, and a forceps tool 114.

The lever 10 is preferably laser cut from ⅛" thick mild steel stock. The lever 10 is detachably coupled to the weight assist arm 12. The lever 10 has a formed lower end 14 configured to include a U-shaped channel section 16 and an angled face 18 with a fulcrum point 20 and a lower edge 22. The angled face 18 preferably extends about ⅜" below the channel section 16 at an angle of about 130° with respect to the longitudinal axis of the lever 10. The lower outer edge 22 contacts an injector rack head 24 which is confined under an injector rocker arm 26 and in front of a push rod 28 (FIG. 2). The channel section 16 is designed to seat around the push rod 28 when the lever 10 is on the engine and preferably has a separation of approximately ⅜" between the channel sidewalls.

Extending out from the central portion of the lever 10 is a depth limit arm 30 preferably about 2½" above the channel section 16. The depth limit arm 30 rests on the top edge of a rocker arm housing 32 and is a vertical positioner for the contact of the lower outer edge 22 against the injector rack head 24. The depth limit arm 30 forms an angle A of between 60° to 70°; preferably 65°, with the axis of the lever 10 and is approximately 3½" from the lower edge 22. The angle A is important to vertically position the lower edge 22 to be in contact with the rack head 24. As the lever pivots and the depth limit arm 30 slides over the front rocker arm housing wall 32 top edge to maintain the contact between the lower edge 22 and the rack head 24.

The weight assist arm 12 has two 1½" diameter×⅜" thick round weights 33, 33 in the form of milled steel pieces at one end that are secured by a ¼" diameter hole 34 through the weight arm 12 and round pieces 33, 33 and a ¼" roll pin 36 inserted therein. The other end of the weight assist arm 12, which is preferably about 1" wide and ⅛" thick, has a formed hook shaped pocket 38 to be slidably inserted over and down onto an undercut top portion 40 of the lever 10. The overall length of the weight assist arm 12 is preferably about 7½". The undercut portion 40 on the lever 10 terminates at a notch 42 which limits a bolt 44, screw or other detent mechanism secured to the weight assist arm 12. The distance between the pocket 38 and the bolt 44 corresponds to the width of the undercut portion 40, preferably about 1", to enable the weight assist arm 12 to be detachably and slidably coupled to the lever 10.

The holding fixture 46 is also included in the service tool kit 8 of this invention. The holding fixture 46 includes an L-shaped base 48 with two ⅜" diameter holes 52, 54 bored through a short leg 56 thereof. A long leg 76 is preferably ¼"×1"×4½" and made of steel. The short leg is ¼"×1"×11/16" and also of mild steel and welded, bolted or otherwise secured to the long leg 76 to form an L-shape. The vertical hole 52 is adapted to hold a shaft 60 extending from a vertical dial indicator 62 for measuring fuel timing. The horizontal hole 54 holds a shaft 64 extending from a horizontal dial indicator 66 to measure synchronizing and fuel setting dimensions.

A mounting block 68 made of steel, measuring 1"×¾"×¼" with a pair of holes (not shown) through the ¾" length and a hole 72 through the ¼" thickness, is secured to s front face 74 of the long leg 76 of the base 48. The hole 72 has a provision for a pin 77, extending out from the side of the mounting block 68 in order to locate a round pivot rod 78 having a precision contact ball 80, 82 preferably 5/16" in diameter secured at each end. The pin 77 pivotally attaches the pivot rod 78 to the mounting block 68 preferably about 2" above the bottom edge of the long leg 76. The pivot rod 78 is preferably 4 1/16" long with the pin 77 equal distance from each end. The upper contact ball 80 is positioned and aligned to be in contact with the free end of the shaft 64 of the horizontal dial indicator 66.

A stainless steel leaf spring 84 measuring 9/16" wide, 0.028" thick and 2⅝" long is secured by two socket head screws 86, 86 (8–32×1") through two 3/16" holes (not shown) in the leaf spring 84. The screws 86, 86 are secured to the pair of holes (not shown) in block 68. The leaf spring 84 rests against an inside wall 88 of the rocker arm housing when the fixture 46 is inserted into a calibration position on an injector as seen in FIG. 2. The shaft 60 of the vertical dial indicator 62 is secured to the base 48 by a 3/16" set screw (not shown) in the base. The shaft 64 of the horizontal dial indicator 66 is secured by a 3/16" set screw (not shown) to the base 48. On the side edge near the top of the fixture 46 and proximate the intersection of the short leg 56 and long leg 76, a roll pin 94 extends from a hole 96 measuring 3/32"×⅜" deep. The pin 94 is preferably 3/32"×1" and pressed into the hole 96 located preferably 9/16" from the top of the base 48 and acts as an adjusting tool guide and support for synchronizing calibrations when the fixture 46 is in a calibration position on the engine as in FIG. 2.

The diesel engine service tool kit 8 of this invention also includes the synchronizing and fuel setting adjusting tool 98. The synchronizing and fuel setting adjusting tool 98 is provided in the kit 8 to make the appropriate calibration adjustments to the fuel setting screw associated with the No. 1 injector or the injector rack control linkage provided for the synchronization of each of the remaining injectors on the diesel engine. The adjusting tool 98 includes an elongated tubular housing 100, preferably 6⅝" long and ¼" outer diameter with a socket 102, preferably 7 millimeter size, secured at the lower end of the housing 100. A generally circular handwheel disk 104 preferably 1½" diameter is secured at the upper end of the tubular housing 100. A bore hole 90 preferably 3/16" diameter extends through the handwheel 104 and tubular housing 100 and socket 102 into which a rod 106 is frictionally retained. The rod 106, preferably 7 11/16" long, has an Allen wrench 108, preferably 2 millimeter size, secured at a lower end and a cylindrical adjusting knob 110 at the upper end thereof. The rod 106 is frictionally retained within the tubular housing 100 and is capable of both axial and rotational movement with respect to the tubular housing 100. With the cylindrical adjustment knob 110 in contact with the upper face of the handwheel 104 and the rod 106 inserted into the tubular housing 100, the Allen wrench 108 projects from the socket 102. The synchronization and fuel setting adjustment tool 98 enables the technician to release a locknut with the socket 102 when the Allen wrench 108 is retracted therein. The locknut surrounds a set screw and once the locknut is released by the technician rotating the handwheel 104 and thereby the socket 102 on the adjusting tool 98, the Allen wrench 108 is inserted into the set screw by depressing the adjustment knob 110. Once the Allen wrench 108 engages the set screw, the synchronization or fuel setting adjustment can be made by rotating the adjustment knob 110 and thereby the set screw engaged with the Allen wrench 108.

The diesel engine service tool kit 8 also includes the generally L-shaped insertion tool 112, preferably bent from ⅛" round mild steel stock, and the holding tool forceps 114 with a pair of generally parallel bent arms 116, 116 joined together by a cross piece 118. The forceps 114 are formed preferably from ⅛" thick mild steel and the bent arms 116, 116 each have an approximate 60° bend 119 beginning about 4" from the cross piece 118, The arms 116, 116 have a ¾" separation preferably and extend about 2¼" below the bend 119. The insertion tool 112 and holding tool forceps 114 are used in combination to secure a link pin extending from the governor of the engine as required during fuel setting operations.

Also included in the tool kit of this invention as shown in FIG. 1 is the generally T-shaped injection timing calibration block 120. A longer leg 122 of the block is preferably exactly 2.5" in length which corresponds to the appropriate injector spring height as required by the fuel timing specifications of the 3116 diesel engine manufacturer. The longer leg 122 is mounted to a shorter base leg 124. The holding fixture 46 and vertical dial indicator 62 are calibrated for fuel timing with the injection timing calibration block 120 by placing the upper face of the base leg 124 in contact with the short leg 56 of the holding fixture 46 so that the free end of the vertical dial indicator shaft 60 contacts an upper end face 126 of the long leg 122. With the calibration block 120 in place on the holding fixture 46, the vertical dial indicator 62 is set to a reference or zero position in preparation for measuring the injector spring height of each injector on the engine for the fuel timing calibration.

OPERATION—ENGINE TUNING

Synchronization

The operation and description of a 3116 diesel engine 130 are accurately described for one of ordinary skill in the art in the *Service Manual* 3116 *Diesel Truck Engine*, Form No, SEBR0550, October 1989, which is hereby incorporated by reference, specifically pages 3-6 through 3-18 directed to synchronization, fuel setting and fuel timing, Synchronization and fuel setting can be performed with the injectors of the engine in any position (i.e., top center compression, top center exhaust, etc.). Injector Nos. 2-6 are synchronized to match the position of No. 1 injector. For synchronization, the lower formed end 14 of the lever 10 is inserted behind a No. 1 injector push rod 28 to just below a ball and socket 134 feature of the push rod 132. The lever 10 is then turned until it is parallel with the injector rocker arm 26 and the channel section 16 is seated around the push rod 1132 as in FIG. 2. The lever 10 is then tilted in a direction parallel to the rocker arm 26 until the depth limit arm 30 touches the rocker arm housing 32 upper edge. Contact between the limit arm 30 and the housing 32 is maintained as the upper portion of the lever 10 pivots away from the No. 1 injector. The lever 10 is pivoted with sliding contact between the limit arm 30 and housing 32 upper edge until the lower edge 22 contacts to the No. 1 rack head 24 and forces a rack stop bar 138 attached to the rack head 24 into contact with an injector base 140. This position is the fuel shutoff position. At this point, the weight assist arm 12 is coupled to the lever 10 onto the undercut portion 40 at top of lever 10 to overcome the spring bias of an injector control linkage 142 and maintain the No. 1 injector in the fuel shutoff position without further assistance from the technician nor removal of the rocker arm assembly 26.

The holding fixture 46 is then successively inserted onto injectors Nos. 2-6 for synchronization with respect to the No. 1 injector as maintained in the fuel shutoff position. To insert the holding fixture 46 into the calibration position as shown in FIG. 2, the top contact ball 80 of the pivot rod 78 is depressed against the end of the horizontal dial indicator shaft 64 to allow the lower contact ball 82 to position in front of the end of the rack bar 136. This can be released after inserting. The holding fixture 46 is inserted with the leaf spring 84 depressed against the housing 88, the base 48 in contact atop a shoulder 144 on the injector base 140 and the lower contact ball 82 in front of the rack bar 136.

The synchronizing adjustment is accomplished by adjusting a set screw 146 and locknut 148 to change the relationship between a clamp 150 and collar 152 on the injector rack control linkage 142. The control linkage 142 for all the injectors (Nos. 2-6) are commonly mounted on a spring biased injector rack shaft 154.

With the lever 10 and weight assist arm 12 maintaining the No. 1 injector in fuel shutoff or synchronization position and the holding fixture 46 inserted on the injector to be synchronized as previously described, the synchronization and fuel setting adjustment tool 98, with the inner rod 106 and Allen wrench 108 retracted so that the adjustment knob 110 is spaced from the handwheel 104, is inserted as shown in FIG. 2 so that the socket 102 engages the, locknut 148 on the injector rack control linkage 142. The roll pin 94 extending from the base 48 of the holding fixture 46 is advantageously positioned to support the adjusting tool 98 at the appropriate orientation once the socket 102 is seated on the locknut 148 so that the technician is not required to continuously maintain control of the adjusting tool 98 during the synchronization operation. The handwheel 104 can then be rotated to release the locknut 148 and the adjustment knob 110 is depressed to insert the Allen wrench 108 into the Allen head set screw 146 on the control linkage 142. Once the locknut 148 is released, the adjustment knob 110 is rotated to rotate the set screw 146 and thereby adjust the angular relative position between the collar 152 and clamp 150 on the control linkage 142. Adjusting the control linkage 142 thusly repositions the rack bar 136 and rack stop bar 138 with respect to the injector base 140 to synchronize the Nos. 2-6 injectors. The set screw 146 is rotated until the spring bias control linkage 142 positions the rack bar 136 to a reading of 0.01 to 0.05 millimeters as indicated by the horizontal dial indicator 66 and as required in the service specification manual from the 3116 engine manufacturer. Once the rack bar 136 is adjusted to this position, the handwheel 104 is rotated to secure the locknut 148 and thereby maintain the synchronized position of the rack bar 136. The synchronization adjustment can be repeated for each subsequent injector by removing the holding fixture 46 and reinserting it into the calibration position for the appropriate injector and adjusting the control linkage 142 with the synchronization and fuel setting adjustment tool 98 as described hereinabove.

Fuel Setting

The fuel setting is the adjustment of a fuel setting screw 156 on a holding clamp assembly 158 to provide a specified injector rack position measured on the No. 1 injector. The fuel setting screw 156 limits the power output of the engine 130 by setting the maximum travel of all the injector rack bars 136. Prior to performing the fuel setting calibration, the injectors must all be correctly synchronized as previously described. The fuel setting screw 156 and holding clamp assembly 158 on the injector rack shaft 154 is positioned proximate the No. 1 injector and shown in FIG. 3.

The holding fixture 46 is inserted into the calibration position on No. 1 injector with the No. 1 injector maintained in the fuel shutoff position with the lever 10 and weight assist arm 12 as previously described. The horizontal dial indicator 66 is then set to a reference or zero position and then the lever 10 and weight assist arm 12 are removed to release the rack head 24 and rack stop bar 138 from the fuel shutoff position. The holding forceps tool 114 and insertion tool 112 are used in the fuel setting calibration to secure a governor output shaft 160 projecting from a governor 162 through a hole 164 in the rocker arm housing 32 to a fixed governor calibration point. The use of the forceps tool 114 and insertion tool 112 to achieve the governor calibration point is described in the 3116 *Diesel Truck Engine Service Manual* for the fuel setting procedure. The fuel control solenoid (not shown) is removed to allow free movement of the injector rack control linkage 142 and clamp assembly 158 during fuel setting. The insertion tool 112 is inserted into a link pin opening 166 of the governor output shaft 160 (FIG. 2) and the arms 116, 116 of the forceps tool 114 are inserted on either side of the governor output shaft 160 to secure the governor 162 in the fixed calibration point configuration. The governor output shaft 160 extends through the rocker arm manifold housing 32 and is pivotally pinned to a collar 168 of the holding clamp assembly 158 as shown in FIG. 3.

With the governor output shaft 160 secured in the governor calibration point and the holding fixture 46 inserted on the No. 1 injector in the calibration position, the synchronization and fuel setting adjustment tool 98 is used to adjust the fuel setting screw 156 so that the rack bar 136 of the No. 1 injector indicates the appropriate fuel setting specification as listed on the engine valve cover. The socket 102 on the synchronization and fuel setting adjustment tool 98 is rotated to release a locknut 170 and the Allen wrench 108 is inserted into an Allen head set screw 172 and the adjustment knob 110 is rotated until the required specification for fuel setting is indicated on the horizontal dial indicator 66 showing the required position of the rack bar 136 for maximum power output of the engine 130 and travel of all of the injector racks. The socket 102 is then rotated to secure the locknut 170, the adjustment tool 98 removed and the insertion tool 112 and holding tool forceps 114 removed from the governor output shaft 160 to complete the fuel setting adjustment.

Fuel Timing

Fuel timing is the adjustment of the height D of an injector spring 174 on each of the injectors Nos. 1–6 to correspond to the specified height D between the injector base shoulder 144 and a tappet 176 at the top of the spring 174 which is dimension D in FIG. 2. The fuel timing for injector Nos. 1, 2 and 4 can be accomplished with the No. 1 piston in the top center exhaust stroke configuration; fuel timing for injector Nos. 3, 5 and 6 is accomplished with the No. 1 piston on the top center compression stroke.

After the vertical dial indicator 62 has been calibrated with the injection timing calibration block 120 provided in the diesel engine service tool kit 8 of this invention as previously described, the holding fixture 46 is inserted into calibration position successively on each of the injectors. The fuel timing measurement is indicated by the vertical dial indicator 62 and any required fuel timing adjustment needed on a specific injector is accomplished by rotating a standard slotted fuel timing adjustment screw 178 located on the rocker arm 26 opposite the injector spring 174. The fuel timing adjustment screw 178 is rotated (positive or negative, as required) until the vertical dial indicator 62 indicates the specified injector spring height D based upon its calibration in the service manual requirements for the particular engine.

From the above disclosure of the general principles of this invention and the preceding detailed, description of a preferred embodiment, those skilled in the art will readily comprehend the various modifications to which the present invention is susceptible. The scope and application of this invention is applicable to not only a 3116 Caterpillar diesel truck engine, but other engines, injectors, power train components and similar devices. Therefore, I desire to be limited only by the scope of the following claims and equivalents thereof.

I claim:

1. A dial indicator holding fixture for the synchronization, fuel setting and fuel timing of an engine, said holding fixture comprising:
   a base member having two ends;
   a vertical dial indicator mounted proximate one end of said base member;
   a horizontal dial indicator mounted proximate said one end;
   a rod pivotally mounted to said base at a position intermediate said two ends, said rod having one end disposed adjacent a horizontal shaft of said horizontal dial indicator and another end disposed adjacent an end of a rack bar of an injector of said engine;
   a vertical shaft of said vertical dial indicator engaging a tappet securing a top end of an injector spring; and
   a retainer releasably holding said base to said engine proximate said injector.

2. A dial indicator holding fixture for the synchronization, fuel setting and fuel timing of an engine, said holding fixture comprising:
   a generally L-shaped base having a short and long leg and being capable of holding a pair of dial indicators each having shafts projecting therefrom, said short leg of said base having a vertical and a horizontal bore hole therethrough, the shafts of the vertical and horizontal dial indicators extending through said vertical and horizontal bore holes, respectively;
   a rod pivotally secured to said long leg of said base, said rod having an upper end and a lower end, said upper end of said rod being positioned to engage a terminal end of the shaft of the horizontal dial indicator; and
   a retainer secured to said long leg of said base for removably retaining said holding fixture in a calibration position on the engine with a lower end of said rod engaging an end of a rack bar slidably projecting through an injector base of a cylinder on the engine, a free-end of said long leg of said base contacting a shoulder of the injector base and a terminal end of the shaft of the vertical dial indicator contacting a tappet atop an injector spring, when said holding fixture is in said calibration position the vertical dial indicator being capable of measuring the distance between the tappet and the shoulder for fuel timing and the horizontal dial indicator being capable of measuring the position of the rack bar for synchronization and fuel setting of the engine.

3. The holding fixture of claim 2 wherein said retainer comprises a leaf spring secured to said long leg of said base, said leaf spring being compressed between a rocker arm manifold housing and said base when said holding fixture is in said calibration position.

4. The holding fixture of claim 3 further comprising:
a mounting block secured between said leaf spring and said long leg of said base, said rod being pivotally attached to said mounting block.

5. The holding fixture of claim 2 further comprising:
a lower contact ball secured to said lower end and an upper contact ball secured to said upper end of said rod, said lower contact ball engaging the rack rod and said upper contact ball engaging the shaft of the horizontal dial indicator when said holding fixture is in said calibration position.

6. The holding fixture of claim 2 further comprising:
a positioning pin extending from said base, said positioning pin being capable of supporting a synchronization and fuel setting tool in an operational position when said holding fixture is in said calibration position and the synchronization and fuel setting tool is engaged with a fuel setting screw on the injector rack linkage.

* * * * *

UNITED STATES PATENT AND TRADEMARK OFFICE
CERTIFICATE OF CORRECTION

PATENT NO. : 5,414,941  
DATED : May 16, 1995  
INVENTOR(S) : Donald L. Carpenter Page 1 of 2

It is certified that error appears in the above-indentified patent and that said Letters Patent is hereby corrected as shown below:

Column 1, Line 27 delete --,-- after "shut".

Column 1, Line 38, delete --,-- after "the".

Column 3, Line 3, "arid" should be --and--.

Column 3, Line 55, delete --;-- after "base".

Column 4, Line 40, delete --;-- after "offers".

Column 4, Line 56, "holdling" should be --holding--.

Column 5, Line 43, delete --,-- after "the".

Column 5, Line 45, delete --,-- after "to".

Column 5, Line 63, "s" should be "a".

Column 7, Line 7, "118," should be --118.--.

Column 7, Line 51, "1132" should be --132--.

Column 8, Line 28, delete --,-- after "the".

UNITED STATES PATENT AND TRADEMARK OFFICE
CERTIFICATE OF CORRECTION

PATENT NO. : 5,414,941

DATED : May 16, 1995

INVENTOR(S) : Donald L. Carpenter

It is certified that error appears in the above-indentified patent and that said Letters Patent is hereby corrected as shown below:

Column 10, Line 11, delete --,-- after "detailed".

Signed and Sealed this

Seventeenth Day of October, 1995

BRUCE LEHMAN

*Attest:*

*Attesting Officer*     *Commissioner of Patents and Trademarks*